US006980892B1

(12) United States Patent
Chen et al.

(10) Patent No.: US 6,980,892 B1
(45) Date of Patent: Dec. 27, 2005

(54) AVIONICS SYSTEM AND METHOD FOR PROVIDING ALTITUDE ALERTS DURING FINAL LANDING APPROACH

(75) Inventors: Susan S. Chen, Chandler, AZ (US); Clayton E. Barber, Independence, MO (US)

(73) Assignee: Garmin International, Inc., Olathe, KS (US)

( * ) Notice: Subject to any disclaimer, the term of this patent is extended or adjusted under 35 U.S.C. 154(b) by 73 days.

(21) Appl. No.: 10/716,735

(22) Filed: Nov. 18, 2003

(51) Int. Cl.[7] .............................................. G06F 7/00
(52) U.S. Cl. ............................ 701/9; 701/16; 340/970
(58) Field of Search ............................... 701/16, 18, 4, 701/8, 9; 340/970, 963

(56) References Cited

U.S. PATENT DOCUMENTS

| | | | |
|---|---|---|---|
| 4,224,669 A | 9/1980 | Brame | 264/433 |
| 4,567,483 A | 1/1986 | Bateman et al. | 340/970 |
| 4,639,730 A | 1/1987 | Paterson et al. | 340/970 |
| 4,684,948 A | 8/1987 | Bateman | 340/970 |
| 4,792,799 A | 12/1988 | Grove | 340/970 |
| 4,849,756 A | 7/1989 | Bateman | 340/970 |
| 4,857,923 A | 8/1989 | Bateman | 340/970 |
| 4,914,436 A | 4/1990 | Bateman et al. | 340/970 |
| 4,916,448 A | 4/1990 | Thor | 340/970 |
| 4,939,513 A | 7/1990 | Paterson et al. | 340/970 |
| 4,987,413 A | 1/1991 | Grove | 340/970 |
| 5,001,476 A | 3/1991 | Vermilion et al. | 340/970 |
| 5,038,141 A | 8/1991 | Grove | 340/970 |
| 5,075,685 A | 12/1991 | Vermilion et al. | 340/970 |
| 5,136,512 A | 8/1992 | Le Borne | 364/461 |
| 5,153,588 A | 10/1992 | Muller | 340/968 |
| 5,187,478 A | 2/1993 | Grove | 340/970 |
| 5,196,847 A | 3/1993 | Bateman | 340/970 |
| 5,220,322 A | 6/1993 | Bateman et al. | 340/970 |
| 5,414,631 A | 5/1995 | Denoize et al. | 364/461 |
| 5,442,556 A | 8/1995 | Boyes et al. | 364/433 |
| 5,488,563 A | 1/1996 | Chazelle et al. | 364/461 |
| 5,495,249 A | 2/1996 | Chazelle et al. | 342/36 |
| 5,519,392 A | 5/1996 | Oder et al. | 340/995 |
| 5,638,282 A | 6/1997 | Chazelle et al. | 364/461 |
| 5,661,486 A | 8/1997 | Faivre et al. | 342/33 |
| 5,677,842 A | 10/1997 | Denoize et al. | 364/461 |
| 5,798,712 A | 8/1998 | Coquin | 340/970 |
| 5,839,080 A | 11/1998 | Muller et al. | 701/9 |
| 5,884,223 A | 3/1999 | Tognazzini | 701/301 |
| 6,076,042 A | 6/2000 | Tognazzini | 701/301 |
| 6,088,634 A | 7/2000 | Muller et al. | 701/9 |

(Continued)

FOREIGN PATENT DOCUMENTS

WO   WO 02/071367 A1  *  9/2002

*Primary Examiner*—Michael J. Zanelli
(74) *Attorney, Agent, or Firm*—David L. Terrell (57) ABSTRACT

An avionics system and method is employed for alerting pilots of low premature descent during final landing approach. The method involves determining Final Approach Flight Safety Altitudes for a plurality of runways, identifying which runway an aircraft is likely to land on, and alerting the pilot if the aircraft altitude is lower than the final approach flight safety altitude. The method takes into account terrain information, airport and runway information, and aircraft reference data to make its determination. Particular embodiments reference the Final Approach Fix, one or more step down fix values, the Minimum Descent Altitude and the Missed Approach Point in calculating the Final Approach Flight Safety Altitudes. The system and method have particular utility with a Terrain Awareness and Warning System ("TAWS") and display in an aircraft.

18 Claims, 5 Drawing Sheets

U.S. PATENT DOCUMENTS

| | | | |
|---|---|---|---|
| 6,092,009 A | 7/2000 | Glover | 701/14 |
| 6,122,570 A | 9/2000 | Muller et al. | 701/9 |
| 6,127,944 A | 10/2000 | Daly et al. | 340/963 |
| 6,138,060 A | 10/2000 | Conner et al. | 701/9 |
| 6,219,592 B1 | 4/2001 | Muller et al. | 701/9 |
| 6,304,800 B1 | 10/2001 | Ishihara et al. | 701/16 |
| 6,489,916 B2 | 12/2002 | Block | 342/65 |
| 6,606,034 B1 * | 8/2003 | Muller et al. | 340/970 |
| 6,606,563 B2 * | 8/2003 | Corcoran, III | 701/301 |
| 6,707,394 B2 * | 3/2004 | Ishihara et al. | 340/970 |

* cited by examiner

AVIONICS SYSTEM AND METHOD FOR PROVIDING ALTITUDE ALERTS DURING FINAL LANDING APPROACH

BACKGROUND OF THE INVENTION

1. Technical Field

The present invention relates generally to determining appropriate aircraft safety clearance altitudes during the final approach of the aircraft to a runway, and more particularly to determining safety clearance altitudes for an aircraft between a Final Approach Fix ("FAF") point and one or more step-down points located between the FAF and the runway.

2. Background Art

Systems are known in the art that provide alerts and advisory indications of premature descent. Among such systems are systems that monitor parameters of the aircraft's flight, particularly the aircraft's current position and flight path information, and a terrain elevation database.

Satellite-based navigational systems, such as Global Positioning System ("GPS"), which can track longitude, latitude, altitude, groundtrack, vertical velocity and ground speed, are becoming an important and reliable source of information for aircraft. An aircraft's Forward Looking Terrain Avoidance ("FLTA") system compares aircraft elevation with terrain data in the region ahead of the aircraft during flight along and below the aircraft's lateral and vertical flight path to provide suitable terrain alerts if a potential threat exists of the aircraft colliding or coming too close to terrain. The computation involves searching through a terrain elevation database for terrain within the aircraft's potential flight path that may violate the aircraft's Required Terrain Clearance ("RTC"). The RTC is the value set by the Federal Aviation Administration as the permitted flight altitude for various phases of aircraft flight. The RTC indicates the clearance distance from terrain below which the aircraft should not fly. A Terrain Awareness Warning System ("TAWS") is a system commonly used for commercial aircraft to specifically alert of potential terrain concerns. The Federal Aviation Administration ("FAA") has instituted TAWS equipment standards that it publishes as Technical Standard Orders ("TSO") (see e.g. TSO-C151b issued in December, 2002).

TAWS have been developed that utilize the advantages of GPS to evaluate the proximity of the aircraft to an airport and the flight altitude of the aircraft above a landing runway to determine if the aircraft is entering a landing procedure. For example, if an aircraft approaches the runway within a predetermined distance range and within a predetermined altitude range, the TAWS will determine that the aircraft is entering a landing procedure. During the landing procedure, the TAWS creates a terrain elevation boundary or minimum alert altitude surrounding the runway. An example of a system describing and explaining the use of a terrain elevation boundary and tracking of aircraft position using a Global Positioning System ("GPS") may be found in U.S. Pat. No. 5,839,080, entitled "Terrain Awareness System." General use of a terrain elevation boundary for calculating and providing terrain alerts during both cruising and landing procedures is well know in the art. By adjusting or desensitizing the aircraft terrain clearance values during a landing procedure from the minimum clearance values required during aircraft cruising flight, nuisance alerts may be reduced.

To provide higher levels of safety during landing yet reduce nuisance alerts, accurate methods of identifying when landing procedures are initiated and accurately identifying an appropriate destination runway is desirable. U.S. Pat. No. 6,304,800, entitled "Methods, Apparatus and Computer Program Products for Automated Runway Selection" discloses a method of identifying a destination runway.

Aircraft using TAWS also provide Premature Descent Alerts ("PDA") during the final approach of the aircraft to the runway to indicate whether the aircraft is descending below a "normal" final approach flight path to the nearest runway (typically a 3 degree implied glideslope). Premature Descent Alerts are generally evaluated and produced independent of in-flight terrain alerts.

Figure 1:
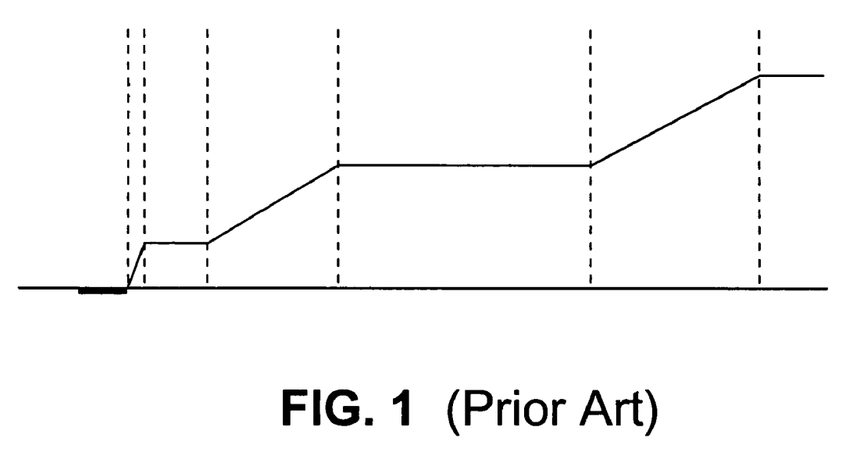
FIG. 1 is a side view of a prior art final approach fixed altitude boundary illustrating step-down stages for providing Premature Descent Alerts.

A typical TAWS may further include a fixed, standard terrain clearance level for all landing approaches and runways. If the aircraft is below the standard terrain clearance altitude for a given radial distance from the runway, an alert is provided. One example of a conventional standard for determining landing clearance altitudes is a system that for all runways and approaches establishes a landing clearance altitude (vertical distance above the runway elevation) at 700 ft clearance for greater than 15 nautical miles (nm) from the runway, slope down to 350 ft for a range between 5 and 12 nm from the runway, slope down to 150 ft for a range between 1 and 2 nm from the runway, and slope down to zero ft from ⅓ nm to the runway, resulting in a step-down approach to the runway. Another standard fixed terrain clearance system uses a 300 ft clearance for between 5 and 2.5 nm that begins sloping from 300 ft to zero at 1 nm to the runway. Another similar approach does not establish vertical altitude levels, but rather establishes fixed terrain clearance levels for fixed radial distances from the runway. In either case, however, a flight safety altitude is established below which the aircraft should not travel. Please reference FIG. 1 for a visual representation of this example.

Conventional Premature Descent Alert systems that provide fixed altitude flight levels or fixed terrain clearance levels for fixed radial distances from the runway regardless of the runway or approach to the runway are insufficient in that they are not conducive to every runway and approach. One particular example that may cause particular problems for a fixed altitude flight level system is where a particular runway is nestled in a valley or has a large tower near it. Ordinarily, for this situation, the pilot would need to approach at a higher altitude and make a more rapid descent than for other runways. With a fixed altitude alert system, the pilot may descend to a level below the height of the mountain or tower prior to reaching it and be required to again ascend to clear the obstacle. The Premature Descent Alert system was programmed only to provide alerts if the aircraft descended below the fixed altitude regardless of the runway. Accordingly, only the related terrain alert systems were used to identify the obstacle. In some systems, however, the terrain alert systems are desensitized to reduce nuisance alerts during landing. This may delay crucial safety warnings and alerts that could otherwise be provided. For a different approach to the same runway, the circumstances of the approach may have been different with different obstacles and terrain.

Another particular example that may cause problems for a fixed clearance flight level system is where the runway is raised significantly above the surrounding terrain such as on a mountain, a mesa, or a cliff. While the fixed clearance levels referenced may have allowed the aircraft to receive necessary alerts in relation to the previous example, the fixed clearance levels may have problems with this example. In this case, the aircraft may have 150–300 feet of clearance above the surrounding terrain and still be below the runway elevation. Again, the pilot will need to correct the flight path, but will only become aware of the needed correction when the pilot gets much closer to the runway. In this case also, if the terrain alert systems are desensitized, crucial safety warnings and alerts may be further delayed until a smooth correction is no longer possible.

Thus, many conventional systems produce landing altitude boundary values that have a fixed radial distance to altitude relationship for every case. In other words, each specific radial distance from the runway always has a fixed associated altitude boundary or flight safety altitude associated with it regardless of the approach direction and regardless of the runway. As a result, conventional systems do not compensate for actual aircraft approach flight paths, runway environment, or airport obstacles, but rather focus only on flight safety altitudes for given radial distances from the runway. This may result in excessive nuisance alerts or added risk of collision with terrain or a structure during final approach because the flight safety altitudes selected as the general rule may not be conducive to a particular approach to a specific runway.

DISCLOSURE OF THE INVENTION

The present invention relates to a system and method for providing a Premature Descent Alert that considers the specific runway environment and obstacles in addition to the surrounding terrain. This involves predetermining and storing Final Approach Flight Safety Altitudes ("FAFSA") or step-down fix for aircraft with respect to a specific final approach to a specific runway. A FAFSA is an altitude associated with a given horizontal distance from an aircraft below which the aircraft should not fly during final approach to a runway. In a general form of the invention, specific runway and runway obstacle data, specific flight approach data, and stored terrain data may all be accounted for and compared to select a value representing the flight safety altitude of the final landing approach for a specific runway and flight path. Distinct from conventional methods that generalize the final landing approach altitude for all runways and approaches, particular embodiments of the present invention provide a FAFSA value specific to each runway and each specific approach available for each runway.

Embodiments of the present invention use a step-down altitude fix for the FAFSA. The step-down altitude comprises step-down points that are determined between the Final Approach Fix ("FAF") and a known point on the runway, generally near an end of the runway. Each of these step-down points has a value that is lower than that of the preceding step-down point. The altitude values are specific to the runway selected and to the approach of the aircraft to that runway. An additional feature of the present invention includes the creation of a specialized FAFSA pattern for the portion of the aircraft approach path immediately before the runway. The FAFSA pattern in this final section may include, but is not limited to, a linear or nonlinear boundary, a quadratic curve, any other approximation of the flight path, and any combination thereof.

Particular advantages of the present invention are found in increased safety through an increase in reliable data used in calculating specific FAFSA values for each runway and approach. Additional safety enhancements are achieved through fewer nuisance alerts being issued to pilots during the crucial final approach phase of landing an aircraft. By selection of a FAFSA pattern in the final section that is different from that used in prior sections, actual pilot landing techniques are taken into consideration to further reduce nuisance alerts and increase safety.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

The Federal Aviation Administration ("FAA") establishes minimum terrain clearance levels that must be maintained for safety during the different phases of flight, namely: enroute, terminal, approach, and departure. One example of FAA TAWS equipment standards may be found in the Technical Standard Order ("TSO") TSO-C151b issued in December, 2002 by the FAA. While the current FAA definition for the "terminal" phase of flight is the flight less than 15 NM from the runway and the "approach" phase of flight is the flight less than 5 NM from the runway, it should be understood that for purposes of the present disclosure, the term "approach" is intended to refer not only to the flight less than 5 NM from the runway, but to flight after which a particular runway and approach to that runway have been selected and the flight has closed on to the Final Approach Fix. This may, of course, include at least some of the flight between 5 NM and 15 NM from the runway, or farther in some cases.

Figure 2:
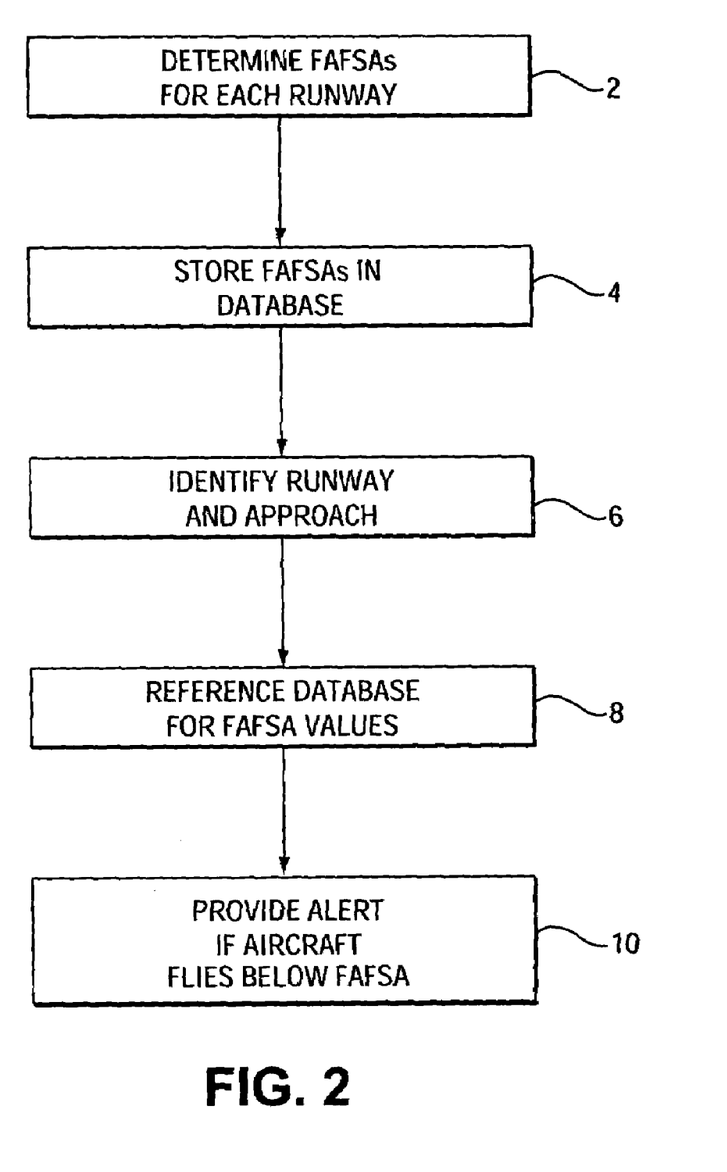
FIG. 2 is a flow diagram illustrating a method of establishing a FAFSA database and providing Premature Descent Alerts by reference to that database according to a particular embodiment of the present invention.

FIG. 2 is a flow diagram illustrating a method of establishing a FAFSA database and providing Premature Descent Alerts by reference to that database. First, appropriate FAFSA values are calculated for each runway in a runway database (Step 2). Determination of FAFSA values for a runway takes into account at least the FAA guidelines, surrounding terrain and obstacles for a particular runway, and at least one of the particular characteristics of the runway itself, such as its elevation, length, Minimum Descent Altitude, and the like. Other factors may also be considered. The FAFSA values selected for a particular runway may further account for data relating to a plurality of flight approach paths available for landing on the runway, the characteristics of the aircraft for which the FAFSA will be used, and other factors. One example of a source to obtain appropriate criteria values for establishing particular FAFSA values for a particular runway and/or approach to a runway is Jeppesen Sanderson, Inc. of Englewood, Colo. Each set of FAFSA values for a particular runway, or for a particular approach to a particular runway, may be stored in a FAFSA database or otherwise stored in association with the airport and runway database information for reference by an aircraft during final approach to a particular runway (Step 4). It will be understood by those of ordinary skill in the art that each runway may have many different approaches with separate FAFSA value sets, or have a common FAFSA value set that applies to all approaches for the runway.

While it is anticipated that in many applications of the present invention, a FAFSA database will be established prior to the aircraft flight for use during final approach by the TAWS of the aircraft, it is contemplated that in particular applications the FAFSA values may be established for a particular runway during flight by reference to a similar set of runway and aircraft data. When doing the FAFSA calculations in-flight, however, additional processor resources and time are required and may slow the system.

EXAMPLE 1

For a particular runway specific to the present example, there are two possible approach patterns, one from the East and one from the West. The runway is situated at the edge of a high cliff (500 feet above the ocean to the East) and is 3.5 miles from a high mountain to the West (elevation 2000 feet above ocean). In determining FAFSA values for the runway, two sets of data are created, one for the approach from the East and one for the approach from the West. For the example, assume the elevation of both ends of the runway is the same (500 feet).

The following FAFSA for a particular aircraft and the approach from the West was calculated and determined: between 4 to 5 NM=3900 feet above ocean; between 3 to 4 NM=3250 feet; between 2 to 3 NM=2200 feet; and the FAFSA slopes down from 2200 feet to the start of the runway. Additionally, a transition slope for the FAFSA was used between each distance segment. The Required Obstacle Clearance value for the approach phase of flight as specified in TERPS, the United States standard for terminal instrument procedures, is 250 Feet; the FAA Required Terrain Clearance value for TAWS is 150 feet for level flight and 100 feet for descending. Each of these requirements is met by the above-determined FAFSA value set. This FAFSA set would be stored in a database for reference by an aircraft approaching the runway from the West.

The following FAFSA for the same aircraft for the approach from the East was calculated and determined: between 4 to 5 NM=1500 feet above ocean (FAFSA value for 4 NM); and the FAFSA slopes down from 1500 feet to the start of the runway. The FAFSA set would be stored in a database for reference by an aircraft approaching the runway from the East. Each FAFSA value established would also meet the FAA clearance requirements. As will be clear to those of ordinary skill in the art, the only FAFSA needed for a situation where there is no terrain or other obstacles to be concerned with (other than a relatively flat lower surface) is the FAF and the elevation of the runway or Missed Approach Point (MAP). If the aircraft is below the FAF prior to reaching the FAF point, an alert will sound. The final approach boundaries can be set up from these two values relative to specific runways or approaches.

Note that while the terrain clearance required over the ocean is only 150 feet for level flight and 100 feet for descent, because the particular approach to the runway and its surrounding environment is contemplated, an appropriate flight safety altitude may be determined for this particular runway and approach. The FAFSA determined and calculated for each runway and approach would readily adapt to runways on cliffs and near high mountains because the differing environments for each approach to each runway are specifically accounted for in the FAFSA value set for that runway and approach. This is still true even if the conventional in-flight terrain clearance warnings are desensitized or disabled during final approach to reduce nuisance warnings.

With reference again to FIG. 2, when an aircraft is landing, the aircraft conventionally identifies which runway it will land upon and which approach it is making to the runway (Step 6). For embodiments of the present invention, once the aircraft has identified the runway, a database is referenced to identify the FAFSA value set for that runway (Step 8). This FAFSA value set is used by the Premature Descent Alert system of the aircraft in providing Premature Descent Alerts if the aircraft flies below the FAFSA (Step 10).

Figure 3:
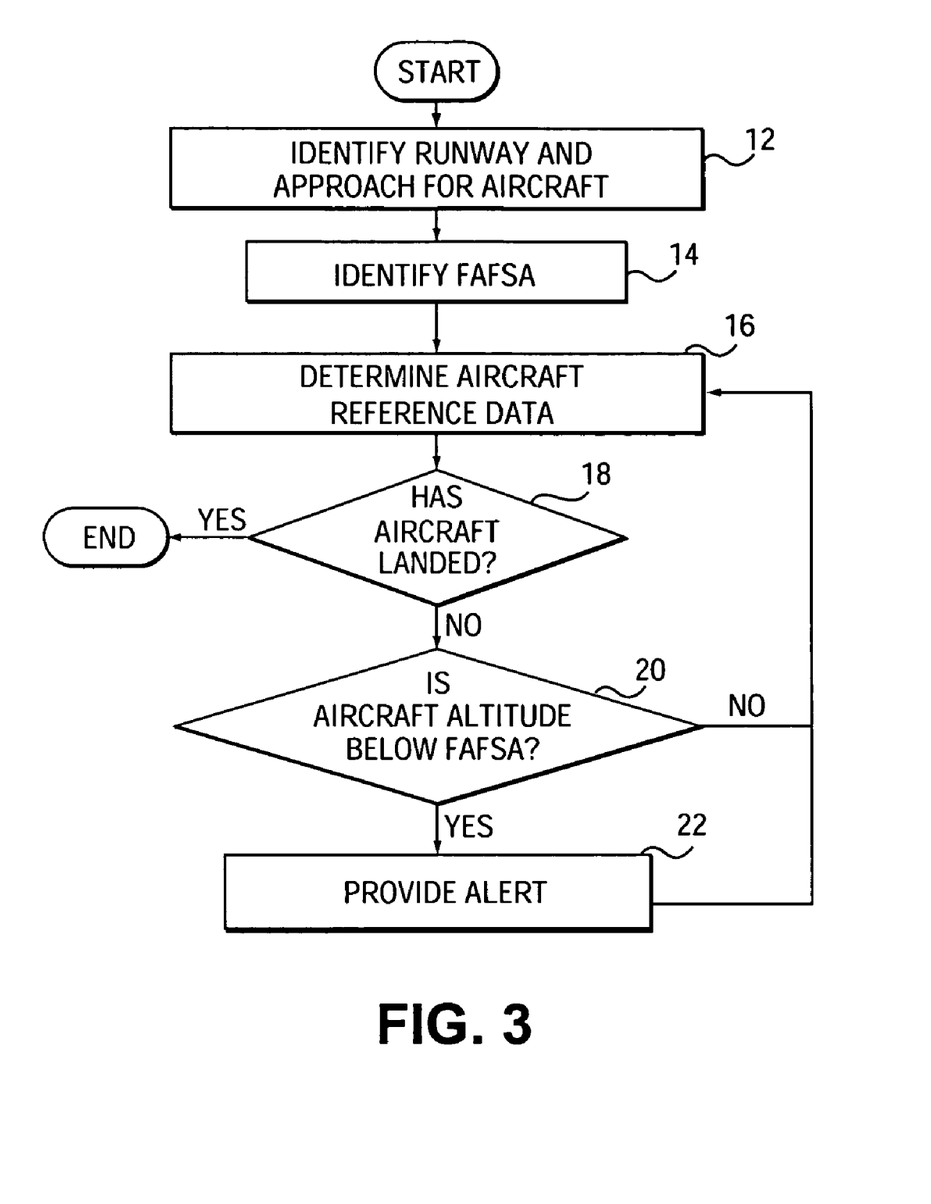
FIG. 3 is a flow diagram illustrating a method of comparing aircraft altitude with a FAFSA for a particular runway landing and approach according to an embodiment of the present invention.
Figure 4:
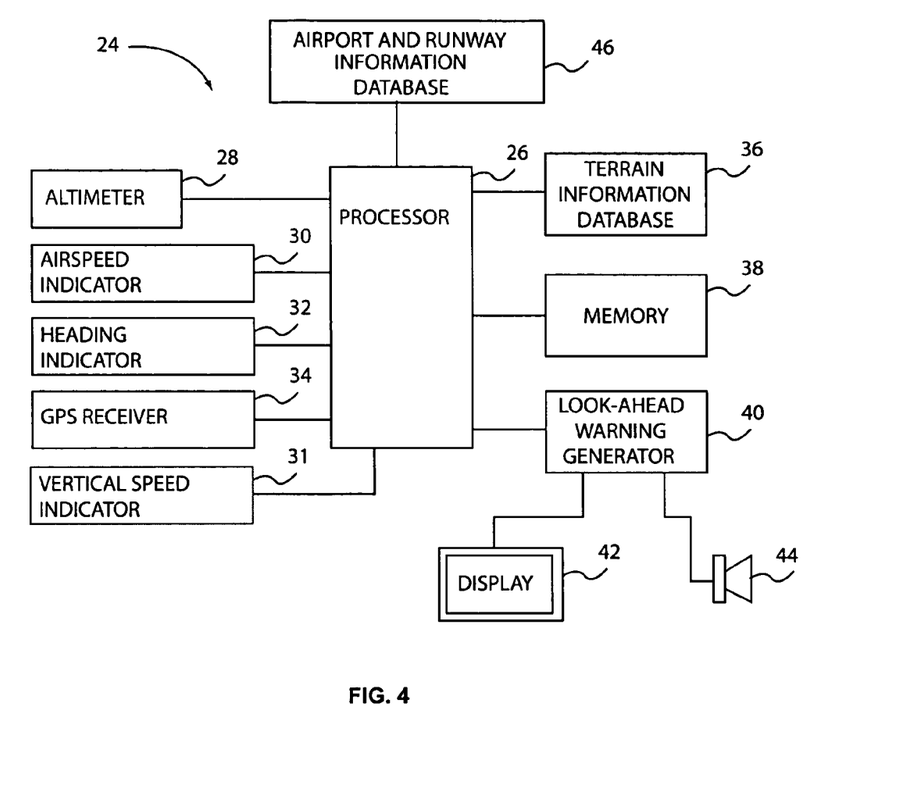
FIG. 4 is a system diagram of a TAWS configured according to an embodiment of the present invention.

FIG. 3 is a flow diagram illustrating a method of comparing aircraft altitude with a FAFSA for a particular runway landing and approach. Reference to FIG. 4 will be used to clarify the elements used in this example of the system. Using inputs to the TAWS of a conventional system, a runway upon which an aircraft is going to land, and the approach to the runway, may be determined. This may be determined either by confirmation of a pilot's entry identifying the runway and approach, or by automatically using the sensors and data associated with the TAWS to compare the characteristics of the aircraft's flight with a predetermined flight approach. Other methods of identifying the runway and landing approach for an aircraft are known in the art and are equally applicable for use with embodiments of the present invention.

Once the particular runway, and optionally the particular approach, is determined for the aircraft (Step 12), TAWS 24 references the airport and runway information database 46 or other database in which the FAFSA are stored, and identifies the FAFSA for the particular runway (Step 14). If a particular runway is not included in the database 46, or if approach data or FAFSA data is not otherwise available, a default set of safety altitude values may be referenced, much like conventional systems, to provide a default altitude for fixed distances from a runway. Alternatively, an appropriate FAFSA may be calculated using whatever data is available, missing data being substituted by default data. Before, during or after Steps 12 and 14, the aircraft's reference data may be determined by the TAWS (Step 16). The aircraft's reference data may include the aircraft's current location, air speed, vertical velocity, and the like, that is conventionally tracked by the TAWS. The aircraft's current location over a geographic region as determined from the GPS receiver 34, the aircraft's altitude as determined from the altimeter 28 and/or GPS receiver 34, the aircraft's speed and vertical velocity as determined from the vertical speed indicator 31 and/or GPS receiver 34, and the aircraft's direction of travel as determined from the heading indicator 32 and/or GPS receiver 34, may all be referenced as well as other reference data conventionally tracked by TAWS.

Once the aircraft has landed, there is no longer a need to compare the aircraft altitude with the FAFSA. Accordingly, a determination is made as to whether the aircraft has landed (Step 18). If the aircraft has landed, the comparisons end. If the aircraft has not yet landed, a comparison is made by the TAWS between the current aircraft altitude and the FAFSA value corresponding to the aircraft's distance from the runway (Step 20). If the aircraft's altitude is not below the FAFSA, determinations as to the aircraft's reference data, whether the aircraft has landed and whether the aircraft is below the FAFSA continue without warning. If, however, the aircraft's altitude is below the next FAFSA, the pilot is given an appropriate alert (Step 22) in addition to the continued determinations. In other words, because the FAFSA are a series of points, each having an associated altitude, the first of the FAFSA being the Final Approach Fix (FAF), if the aircraft's altitude is below the FAF altitude before the aircraft reaches the FAF, an appropriate alert will be issued. Similarly, if the aircraft's altitude is below the altitude of the next FAFSA step before reaching the corresponding position for that step, an alert will be issued.

With specific reference to FIG. 4, a block diagram of a TAWS 24 configured according to an embodiment of the present invention is shown. TAWS systems generally, their components and conventional avionics equipment are well known in the art and are governed by TSOs issued by the FAA. TAWS using satellite navigation information are also well known to those of ordinary skill in the art. The TAWS 24 of FIG. 4 includes a plurality of inputs to a central processor 26 where algorithms for methods of the present invention are executed. The central processor 26 may be a single processor with associated memory as is common in the art, or may be a plurality of processors associated with a number of different systems integral with or separate from the TAWS for performing all or a part of the processor function described herein. The inputs to the processor include signals from devices for collecting information relevant to the various calculations performed by the TAWS 24. Those inputs may include an altimeter 28, an airspeed indicator 30, a vertical speed indicator 31, a heading indicator 32 or ground track from GPS, and a GPS receiver 34, all of which are common to conventional TAWS and are well known in the art. Alternatively, the GPS receiver 34 may be used to provide altitude, airspeed, vertical speed, and ground track indications.

The TAWS 24 also includes a geographic terrain information database 36 that includes at least elevation data for the geographic area over which the aircraft may fly. The locations and elevations of respective runways and airports as well as FAFSA values for those runways are stored within the TAWS 24 in an airport and runway information database 46, or an associated database or memory location 38, that may additionally be configured to include information regarding the terrain if a separate geographic terrain information database 36 is not available or desired. A look-ahead warning generator 40 evaluates the geographic locations identified as being of concern, and produces appropriate alerts by visual display 42 and/or aural alert 44. The look-ahead warning generator 40 may also be configured to provide the alerts and warnings (such as Premature Descent Alerts and terrain alerts and warnings) for the final approach of the aircraft to the runway. Visual display 42 may include display monitors, televisions, LED displays, blinking lights, digital and analog displays, and any other displays known for use with TAWS. Aural alerts 44 may include spoken recorded or synthesized voices, "beeps", or any other aural alerts known for use with TAWS.

The database information stored in the Airport and Runway Information Database 46, terrain information database 36, and particularly the FAFSA values stored in a database for access by the TAWS 24 may be initially stored and later accessed, by any method of interfacing a storage apparatus to a computer system known to those skilled in the art. For example, the data may be stored to a floppy disk drive that is capable of reading and writing programs or data on a floppy disk. The data may also be stored through any other type of data storage device known to those skilled in the art. This would include CD-ROM drives, hard disk drives, optical drives, memory cartridges, compact flash memory, removable memory, external data cartridges, and other data storage devices.

It will be understood that the FAFSA database and corresponding access protocol are capable of distribution as a program product in a variety of forms, and that the present invention applies equally regardless of the particular type of signal bearing media to actually carry out the distribution. The program product tangibly embodies a program of machine-readable instructions executable by a computer system (such as TAWS 24) having a processor capable of supporting access to a database. The program product, in combination with TAWS 24, directs TAWS 24 to perform the embodiments of the current invention. Examples of signal bearing media include recordable type media such as floppy disks and CD ROMS, and transmission type media such as digital and analog communication links, including wireless communication links.

Figure 5:
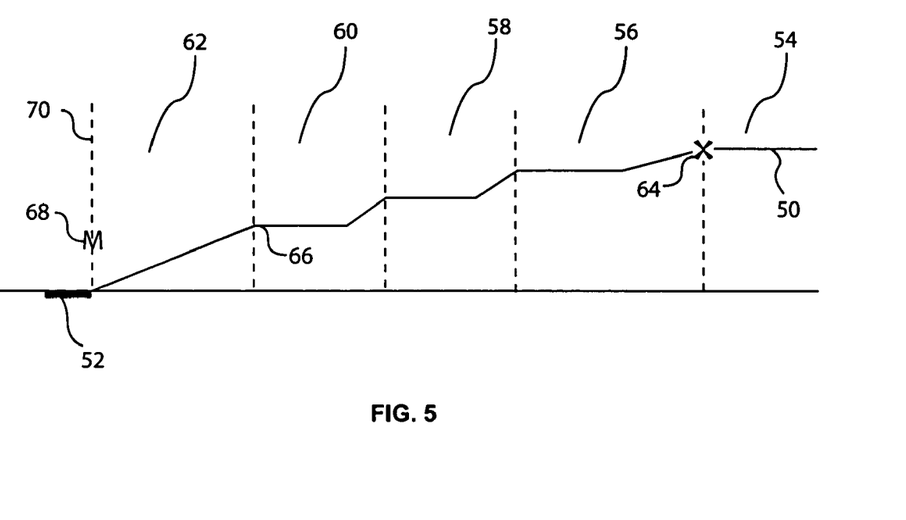
FIG. 5 is a graphical representation of a FAFSA value set shown with respect to linear distance to the runway illustrating step-down stages for providing pilot alerts according to particular embodiments of the present invention.

FIG. 5 is a graphical representation of a FAFSA value set (shown as line 50) with respect to a linear distance from the runway 52 for an example of a non-precision approach. The first section, referenced as section 54, represents the minimum altitude above which the aircraft should remain in the region preceding the distance from the runway at which the FAFSA values begin. The values shown in sections 56, 58 and 60 each represent the FAFSA values transitioning down to the final section 62 preceding the runway 52. Each step-down stage 56, 58, 60 and 62 illustrates a predetermined altitude above which it is appropriate for the aircraft to remain at respective distances from the runway to safely land on the particular runway with which the FAFSA values are associated. As shown in FIG. 5, transition slopes may be used between each step-down stage to transition to a lower altitude. The transition slopes shown in FIG. 5 are for illustration purposes only and do not indicate any required slope for descending and are not generally used for alerting. While the FAFSA reference step-down values generally occur at the vertical lines dividing the step-down stages 56, 58, 60 and 62, at appropriate distances from the runway, intermediate values (and corresponding additional section dividers) may be added depending upon the necessary step-down steps for a particular runway and/or approach. It will be understood by those of ordinary skill in the art that in simple cases, only one or two step-down sections may be used for a particular approach and/or runway. In other cases, more sections may be used.

A Final Approach Fix point ("FAF") is a reference point commonly used by pilots to set up for landing on a runway. The FAF represents the fix from which the final approach to an airport is executed and which identifies the beginning of the final approach segment. The FAF point 64 for the FAFSA values is shown for reference in FIG. 5. The FAF value acts as a first step-down value. Another reference point commonly used by pilots relating to landing procedures, but not previously referenced by any other Premature Descent Alert system, is the Missed Approach Point ("MAP"). The MAP is an altitude reference at or near the threshold to the runway that pilots may use to determine if the pilot should pull-up and not land. The MAP is a point prescribed in each instrument approach procedure at which a missed approach procedure is to be executed if the pilot is unable to see the required visual reference (e.g., runway, runway lights, etc.). For FIG. 5, the MAP 68 is shown with an "M" at the threshold 70 to the runway 52. The MAP value and threshold are dependent upon the specific characteristics of the runway and, in some cases, the type of aircraft landing on the runway.

At a final step-down point 66, the FAFSA may gradually decrease until the FAFSA is at the level of the runway 52 as shown in FIG. 5. The gradual decrease in altitude is a landing technique that may be used once the pilot sees the runway and is flying at the Minimum Descent Altitude ("MDA") when navigating a non-precision approach. However, prior to these conditions, pilots often use what is called a "dive and drive" landing technique when descending to the MDA or to the step-down altitude(s) that may be present between the FAF and MAP. In a "dive and drive" landing technique, on approaches without a step-down fix point, the pilot approaches the FAF in landing configuration and, at some point after passing the FAF, descends quickly to the Minimum Descent Altitude ("MDA"). Once the aircraft has descended to the MDA, the pilot then levels off and flies in landing configuration to the MAP or until the pilot sees the runway and/or another required visual reference. The pilot then attempts to land. For approaches with at least one step-down fix point, the pilot approaches the FAF in landing configuration and at some point after passing the FAF, descends quickly to the step-down altitude for that stage and flies at this altitude until passing the step-down fix point for the step-down stage. Once past the step-down fix point, the pilot again descends quickly to the step-down altitude for the next step-down stage or the MDA if past the step-down fix point for the last step-down stage. Using conventional approaches for defining a flight safety altitude, and even the gradual decrease in the FAFSA shown in FIG. 5, may result in a number of nuisance alerts sounding in response to a dive and drive approach. For pilots who commonly use a "dive and drive" technique from any point during landing, alerts immediately before landing may become so commonplace that they are ignored. For any pilot receiving these unnecessary alerts, the alerts are a nuisance and may distract the pilot while landing the aircraft. Nevertheless, for some airports and runways, there are obstacles, such as towers or buildings that warrant the alerts. In most cases, the dive and drive approach to transitioning from one flight altitude to another may be accounted for by providing alerts only when an aircraft's altitude is below the altitude of the next FAFSA step. For the final step, however, where the next FAFSA step is the runway, additional precautions may be used.

Figure 6:
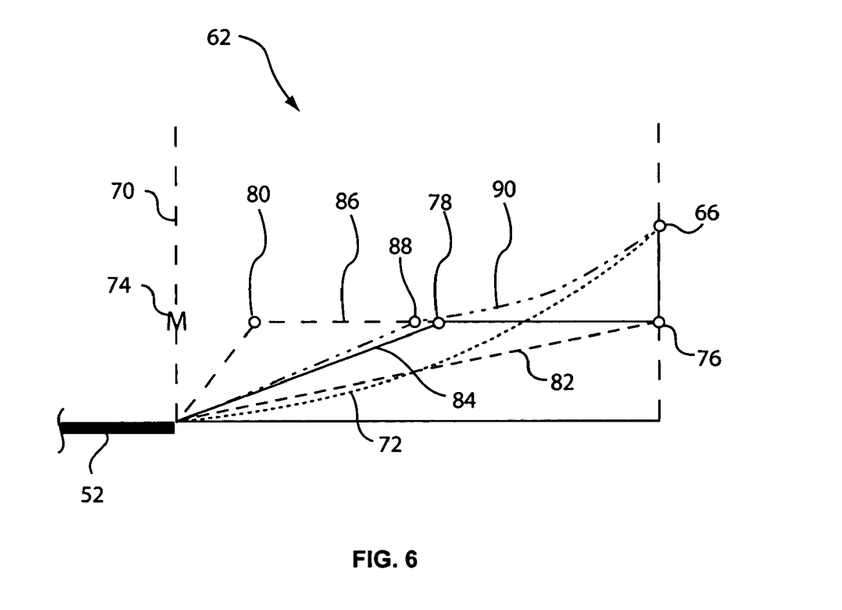
FIG. 6 is a view of a final step-down portion of a final approach flight path and various FAFSA pattern examples according to embodiments of the present invention.

As shown in FIG. 6, to reduce the nuisance alerts and increase the relevance to the pilots of the alerts provided during the final landing segment 62, a variety of possible alternative FAFSA value boundaries are shown. Each of these would provide fewer nuisance alerts than just sloping consistently in the final segment 62 to the runway to accommodate a wider variety of actual landing techniques used by pilots and thus generate fewer nuisance alerts. The specific FAFSA values for these boundaries may be established preflight and stored in the FAFSA database. To significantly reduce the data storage needed, however, the appropriate equation for the final landing segment 62 may be stored, and the calculation for specific values for the final segment boundary may be calculated during flight, depending upon the aircraft's approach.

A first approach boundary, referenced by line 72, is a set of FAFSA values on a quadratic approximation to the actual flight path (altitude ratio=$1-(1-s)^2$, where s is the ratio of the distance left to travel compared to the total distance to the beginning of the curve). Use of this inverted quadratic approximation form allows the curve to drop fast at the beginning of the descending curve rather than the end, which is more similar to the "dive and drive" landing pattern than some other quadratic approaches. To further reduce nuisance warnings, a smaller percentage (i.e. 60–80%) of the calculated reference altitude could be used as the FAFSA for reference in providing alerts during the final segment 62. At some point in manipulating the FAFSA values, however, the ability to generate necessary alerts may be compromised. Provided with the present disclosure, it is believed that those of ordinary skill in the art will be able to readily determine appropriate FAFSA values for any runway and/or approach. Other approximations of flight patterns, such as other quadratic approximations, cubic approximations, and other curves or straight lines, for use as FAFSA boundaries in the final segment 62 are also possible. These approximations, however, are rather rough approximations because the calculations only involve the initial altitude and linear distance to the runway and do not include a calculation of how quickly the aircraft must fall to properly land on the runway.

In addition to the MAP point 68, a Minimum Descent Altitude ("MDA") reference 74, expressed in feet above mean sea level, is used to indicate the altitude to which descent is authorized on final approach or during circle-to-land maneuvering in execution of a standard instrument approach procedure where no electronic glideslope is provided. Like the MAP location, the MDA is specifically dependent upon the characteristics of the runway and type of aircraft landing on it. Also like the MAP, the MDA has not previously been referenced by a Premature Descent Alert system. The MDA may optionally be used in particular embodiments of the present invention to further reduce the nuisance warnings by allowing the FAFSA to account for the rate at which the pilot will likely descend to properly land on the runway. Use of the FAF and step down fixes in embodiments of the present invention, which have also not previously been referenced by Premature Descent Alert systems, similarly further reduce nuisance warnings.

One example of how the MDA may be referenced in determining an appropriate FAFSA value set for the final segment 62 is to identify a point 76, 78 or 80 between the starting point 66 of the final segment 62 and the runway 52 that is at the MDA. The FAFSA values may be selected along a line 82, 84 or 86 that drops from the starting point 66 to the MDA 74 level, and follows the MDA level until it reaches the point 76, 78 or 80, and thereafter gradually slopes down to the runway 52. The specific location of the point 76, 78 or 80 between the starting point 66 of the final segment 62 and the runway 52 may be determined by one of ordinary skill in the art based upon the runway and aircraft characteristics as well as the tolerance for nuisance alerts. Alternatively, a point, such as the midpoint 88 or other point 76, 78 or 80, may be selected and a quadratic or other approximation used to approximate a flight path down to the MDA 74 level and the slope thereafter gradually dropped to the runway level as shown by line 90.

As will be clear to those of ordinary skill in the art, there are an infinite number of possible FAFSA data sets for the final segment 62, many of which reference the MDA, and many of which do not. The examples provided herein are a few examples considered to be appropriate in many situations. Many more are contemplated. For embodiments of the invention where the FAFSA value sets for runways are predetermined and stored in a database for use by TAWS, the MDA may be referenced during the calculation. For embodiments of the invention where the FAFSA value sets are calculated by TAWS during flight, the MDA may be stored in the airport and runway information database 46 (FIG. 4) or other database for reference by TAWS in making the FAFSA determination.

Variation of the FAFSA values determined for a particular runway or approach may also be dependent upon surrounding terrain and obstacles. Adjustment of the FAFSA values during their determination to account for terrain and obstacles adjacent the runway may be necessary. For example, if a particular runway has a tower or large hill near one end of the runway but not near the other end, the specific FAFSA values for the different approaches to the runway may also be different. Additionally, for some runways, the elevation of one end of the runway is much higher (even hundreds of feet higher) than the opposite end. By determining FAFSA values specific to a particular runway and even a particular approach, much greater safety is achieved and fewer, more relevant, nuisance alerts are provided.

As will be clear to those of ordinary skill in the art, the FAFSA values referenced and shown herein may be stored in the database as a plurality of reference points at a plurality of distances from the runway (shown graphically in FIG. 5 by connecting the points), or may alternatively be represented, in whole or in part, as a linear equation. It will be clear to those of ordinary skill in the art from the disclosure provided herein that embodiments of the present invention do not limit the FAFSA to a strictly linear or even a continuous set of values. Even for those embodiments in which linear equations are used to determine or establish a particular boundary, the particular FAFSA stored and referenced by the TAWS for providing the alerts and warnings may include only discrete points on the lines defined by the linear equations. It may alternatively reference only crucial reference points for the particular runway associated with a particular FAFSA value set.

Additionally, it will be clear to those of ordinary skill in the art, that reference to the specific MDA and MAP values for a particular runway in determining FAFSA values and in providing final approach alerts also enables other alerts not previously possible. The data relating to MAP and MDA for each runway may be stored in association with the FAFSA data for the runway or may be stored separately. In either case, reference to specific alert data for a specific runway provides significant advantages as compared with fixed distance and altitude or terrain clearance alerts.

The embodiments and examples set forth herein were presented to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A method of providing a Premature Descent Alert for an aircraft during a final landing approach, the method comprising:
    determining a plurality of Final Approach Flight Safety Altitudes for each of a plurality of runways;
    storing the determined Final Approach Flight Safety Altitudes in association with each corresponding runway upon a media readable by a Terrain Awareness and Warning System ("TAWS");
    identifying upon which runway an aircraft will land; and
    generating a Premature Descent Alert during the final landing approach for the aircraft to the runway by reference to the determined Final Approach Flight Safety Altitudes for the identified runway, wherein the Final Approach Flight Safety Altitudes further comprise Final Approach Flight Safety Altitudes corresponding to each of at least two approaches to at least one of the runways.

2. A method of providing a Premature Descent Alert for an aircraft during a final landing approach, the method comprising:
    determining a plurality of Final Approach Flight Safety Altitudes for each of a plurality of runways;
    storing the determined Final Approach Flight Safety Altitudes in association with each corresponding runway upon a media readable by a Terrain Awareness and Warning System ("TAWS");
    identifying upon which runway an aircraft will land; and
    generating a Premature Descent Alert during the final landing approach for the aircraft to the runway by reference to the determined Final Approach Flight Safety Altitudes for the identified runway, wherein the Final Approach Flight Safety Altitudes corresponding to each of the runways correspond to determined distances from each runway, the final approach safety altitudes representing step-down points on a flight safety altitude for reference by an aircraft landing on the runway.

3. The method of claim 2, wherein the Final Approach Flight Safety Altitudes are between a Final Approach Fix point for the runway and a runway.

4. A method of providing a Premature Descent Alert for an aircraft during a final landing approach, the method comprising:
    determining a plurality of Final Approach Flight Safety Altitudes for each of a plurality of runways;
    storing the determined Final Approach Flight Safety Altitudes in association with each corresponding runway upon a media readable by a Terrain Awareness and Warning System ("TAWS");
    identifying upon which runaway aircraft will land; and
    generating a Premature Descent Alert during the final landing approach for the aircraft to the runway by reference to the determined Final Approach Flight Safety Altitudes for the identified runway, wherein at least a portion of the plurality of Final Approach Flight Safety Altitudes are determined during the aircraft's flight in which the Final Approach Safety Altitudes are referenced.

5. A method of providing a Premature Descent Alert for an aircraft during a final landing approach, the method comprising:
    determining a plurality of Final Approach Flight Safety Altitudes for each of a plurality of runways;
    storing the determined Final Approach Flight Safety Altitudes in association with each corresponding runway upon a media readable by a Terrain Awareness and Warning System ("TAWS");
    identifying upon which runway an aircraft will land; and
    generating a Premature Descent Alert during the final landing approach for the aircraft to the runaway by reference to the determined Final Approach Flight Safety Altitudes for the identified runway, wherein at least a portion of the Final Approach Flight Safety Altitudes are each determined such that they lie upon a curve that approximates a vertical flight path.

6. The method of claim 5, wherein at least a portion of the curve is a quadratic curve.

7. The method of claim 5, wherein the portion lying upon a curve that approximates a vertical flight path is within a segment nearest the runway.

8. The method of claim 5, wherein the curve approximates a dive and drive flight path.

9. A method of providing a Premature Descent Alert for an aircraft during a final landing approach, the method comprising:
   determining a plurality of Final Approach Flight Safety Altitudes for each of a plurality of runways;
   storing the determined Final Approach Flight Safety Altitudes in association with each corresponding runway upon a media readable by a Terrain Awareness and Warning System ("TAWS");
   identifying upon which runway an aircraft will land; and
   generating a Premature Descent Alert during the final landing approach for the aircraft to the runway by reference to the determined Final Approach Flight Safety Altitudes for the identified runway, wherein a portion of the plurality of Final Approach Flight Safety Altitudes are determined during the aircraft's flight in which the Final Approach Safety Altitudes are referenced and are determined such that they lie upon a curve that approximates a vertical flight path.

10. The method of claim 9, wherein the portion of Final Approach Flight Safety Altitudes determined such that they lie upon a curve that approximates a vertical flight path is within a segment nearest the runway.

11. A Terrain Awareness and Warning System (TAWS) for an aircraft, the TAWS comprising:
   at least one information database configured to store elevation and position information for a terrain region and a plurality of Final Approach Flight Safety Altitude values specific to each of a plurality of runways;
   a look-ahead warning generator configured to receive indications of terrain clearance alerts and communicate the indications by at least one of a visual display and an aural alert; and
   a processor coupled to the information database and the look-ahead warning generator, the processor configured to identify a runway on which the aircraft will land, and employ the Final Approach Flight Safety Altitude values for the identified runway to cause the look-ahead warning generator to generate an alert if the aircraft flies below the Final Approach Flight Safety Altitude values for the identified runway when the aircraft is in its final approach to the runway, wherein the Final Approach Flight Safety Altitudes specific to each of the plurality of runways further comprise Final Approach Flight Safety Altitudes specific to each of at least two approaches to at least one of the runways.

12. A Terrain Awareness and Warning System (TAWS) for an aircraft, the TAWS comprising:
   at least one information database configured to store elevation and position information for a terrain region and a plurality of Final Approach Flight Safety Altitude values specific to each of a plurality of runways;
   a look-ahead warning generator configured to receive indications of terrain clearance alerts and communicate the indications by at least one of a visual display and an aural alert; and
   a processor coupled to the information database and the look-ahead warning generator, the processor configured to identify a runway on which the aircraft will land, and employ the Final Approach Flight Safety Altitude values for the identified runway to cause the look-ahead warning generator to generate an alert if the aircraft flies below the Final Approach Flight Safety Altitude values for the identified runway when the aircraft is in its final approach to the runway, wherein the Final Approach Flight Safety Altitudes specific to each of the runways correspond to predetermined distances from each runway, the final approach safety altitudes representing step-down points of a flight safety altitude for reference by an aircraft landing on the runway.

13. The TAWS of claim 12, wherein the Final Approach Flight Safety Altitudes are between a Final Approach Fix point for the runway and a runway.

14. A Terrain Awareness and Warning System (TAWS) for an aircraft, the TAWS comprising:
   at least one information database configured to store elevation and position information for a terrain region and a plurality of Final Approach Flight Safety Altitude values specific to each of a plurality of runways;
   a look-ahead warning generator configured to receive indications of terrain clearance alerts and communicate the indications by at least one of a visual display and an aural alert; and
   a processor coupled to the information database and the look-ahead warning generator, the processor configured to identify a runway on which the aircraft will land, and employ the Final Approach Flight Safety Altitude values for the identified runway to cause the look-ahead warning generator to generate an alert if the aircraft flies below the Final Approach Flight Safety Altitude values for the identified runway when the aircraft is in its final approach to the runway, wherein at least a portion of the Final Approach Flight Safety Altitudes are each determined such that they lie upon a curve that approximates a vertical flight path.

15. The TAWS of claim 14, wherein the portion of the Final Approach Flight Safety Altitudes determined such that they lie upon a curve that approximates a vertical flight path is determined during the flight in which the Final Approach Flight Safety Altitudes are referenced.

16. The TAWS of claim 14, wherein at least a portion of the curve is a quadratic curve.

17. The TAWS of claim 14, wherein the portion lying upon a curve that approximates a vertical flight path is within a segment nearest the runway.

18. The TAWS of claim 14, wherein the curve approximates a dive and drive flight path of the aircraft.

* * * * *